(12) United States Patent
Hundemer

(10) Patent No.: US 10,593,365 B2
(45) Date of Patent: *Mar. 17, 2020

(54) METHODS AND SYSTEMS FOR DETERMINING THAT A VIDEO-CAPTURING DEVICE IS UNSTEADY

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/368,021

(22) Filed: Mar. 28, 2019

(65) Prior Publication Data

US 2019/0222765 A1   Jul. 18, 2019

Related U.S. Application Data

(63) Continuation of application No. 15/295,767, filed on Oct. 17, 2016, now Pat. No. 10,291,849.

(Continued)

(51) Int. Cl.
*H04N 21/24* (2011.01)
*H04N 5/232* (2006.01)
(Continued)

(52) U.S. Cl.
CPC .............. *G11B 27/031* (2013.01); *G08B 3/10* (2013.01); *G08B 5/36* (2013.01); *G11B 27/11* (2013.01);
(Continued)

(58) Field of Classification Search
CPC .............. H04N 21/24; H04N 21/2402; H04N 21/2407; H04N 21/2408; H04N 21/44209; H04N 21/44245; H04N 5/232; H04N 5/23251; H04N 5/23261; H04N 5/23264; H04N 5/23267; H04N 17/002; G07C 5/0866
See application file for complete search history.

(56) References Cited

U.S. PATENT DOCUMENTS

| 5,926,212 A | 7/1999 | Kondo |
| 5,943,450 A | 8/1999 | Hwang |

(Continued)

FOREIGN PATENT DOCUMENTS

| JP | 2005354419 A | 12/2005 |
| WO | 2016155125 A1 | 10/2016 |

*Primary Examiner* — James R Sheleheda
(74) *Attorney, Agent, or Firm* — McDonnell Boehnen Hulbert & Berghoff LLP

(57) ABSTRACT

In one aspect, an example method includes (i) capturing, by a computing system, via a camera of the computing system, video content; (ii) encoding, by the computing system, the captured video content to generate a video stream; and (iii) while generating the video stream: (a) making, by the computing system, a determination that each condition in a condition set is satisfied, wherein the condition set includes a condition relating to a change in a data rate of the video stream; and (b) responsive to making the determination, outputting, by the computing system, via a user interface of the computing system, an indication that the computing system is unsteady.

20 Claims, 7 Drawing Sheets

Related U.S. Application Data

(60) Provisional application No. 62/242,593, filed on Oct. 16, 2015.

(51) Int. Cl.

| | | |
|---|---|---|
| H04N 21/44 | (2011.01) | |
| G11B 27/031 | (2006.01) | |
| H04L 29/06 | (2006.01) | |
| G11B 27/11 | (2006.01) | |
| H04N 21/234 | (2011.01) | |
| G11B 27/19 | (2006.01) | |
| H04N 21/84 | (2011.01) | |
| H04N 21/845 | (2011.01) | |
| H04N 21/854 | (2011.01) | |
| H04N 21/262 | (2011.01) | |
| H04N 21/81 | (2011.01) | |
| H04N 21/4627 | (2011.01) | |
| H04N 21/472 | (2011.01) | |
| H04N 21/6587 | (2011.01) | |
| H04N 21/439 | (2011.01) | |
| H04N 21/442 | (2011.01) | |
| H04N 21/488 | (2011.01) | |
| H04N 5/77 | (2006.01) | |
| H04R 29/00 | (2006.01) | |
| G08B 3/10 | (2006.01) | |
| G08B 5/36 | (2006.01) | |
| H04N 5/272 | (2006.01) | |
| H04N 7/01 | (2006.01) | |

(52) U.S. Cl.
CPC .......... *G11B 27/19* (2013.01); *H04L 65/4076* (2013.01); *H04L 65/602* (2013.01); *H04L 65/605* (2013.01); *H04L 65/607* (2013.01); *H04N 5/232* (2013.01); *H04N 5/23251* (2013.01); *H04N 5/23261* (2013.01); *H04N 5/23267* (2013.01); *H04N 5/272* (2013.01); *H04N 5/77* (2013.01); *H04N 7/0127* (2013.01); *H04N 21/234* (2013.01); *H04N 21/23424* (2013.01); *H04N 21/24* (2013.01); *H04N 21/2408* (2013.01); *H04N 21/262* (2013.01); *H04N 21/4394* (2013.01); *H04N 21/44* (2013.01); *H04N 21/44008* (2013.01); *H04N 21/44209* (2013.01); *H04N 21/4627* (2013.01); *H04N 21/472* (2013.01); *H04N 21/4884* (2013.01); *H04N 21/6587* (2013.01); *H04N 21/8126* (2013.01); *H04N 21/84* (2013.01); *H04N 21/8456* (2013.01); *H04N 21/854* (2013.01); *H04R 29/001* (2013.01); *H04N 5/23293* (2013.01); *H04R 2420/05* (2013.01); *H04R 2420/07* (2013.01)

(56) References Cited

U.S. PATENT DOCUMENTS

| | | |
|---|---|---|
| 6,560,284 B1 | 5/2003 | Girod et al. |
| 6,606,422 B1 | 8/2003 | Dulin et al. |
| 6,798,447 B1 | 9/2004 | Katsuki |
| 7,280,149 B2 | 10/2007 | Weintroub et al. |
| 7,339,613 B2 | 3/2008 | Lee et al. |
| 7,466,342 B2 | 12/2008 | Ohmori et al. |
| 7,508,423 B2 | 3/2009 | Ohmori et al. |
| 7,724,283 B2 | 5/2010 | Kobayashi et al. |
| RE44,888 E | 5/2014 | Umeda et al. |
| 8,773,589 B2 | 7/2014 | Lord |
| 8,923,400 B1 | 12/2014 | Alvarez et al. |
| 9,071,814 B1 | 6/2015 | Fan et al. |
| 9,578,212 B2 | 2/2017 | Milosevski et al. |
| 9,762,856 B2 | 9/2017 | Fagadar-Cosma et al. |
| 10,291,849 B1 * | 5/2019 | Hundemer .............. G08B 3/10 |
| 2008/0187047 A1 | 8/2008 | Stephan et al. |
| 2009/0110372 A1 | 4/2009 | Morioka et al. |
| 2010/0157070 A1 | 6/2010 | Mohanty et al. |
| 2010/0189175 A1 | 7/2010 | Fujii et al. |
| 2010/0265344 A1 | 10/2010 | Velarde et al. |
| 2010/0303296 A1 | 12/2010 | Hattori |
| 2010/0309987 A1 | 12/2010 | Concion et al. |
| 2012/0301099 A1 | 11/2012 | Hirano |
| 2012/0320265 A1 | 12/2012 | Balram et al. |
| 2014/0071309 A1 | 3/2014 | Price et al. |
| 2014/0169473 A1 | 6/2014 | Zuo et al. |
| 2014/0241648 A1 * | 8/2014 | Kunishige .............. H04N 5/232 382/309 |
| 2014/0247370 A1 | 9/2014 | Lee et al. |
| 2014/0313354 A1 * | 10/2014 | Kusanagi ........... H04N 5/23267 348/208.6 |
| 2014/0362927 A1 | 12/2014 | Chung et al. |
| 2015/0097976 A1 * | 4/2015 | Nakanishi .............. H04N 5/145 348/208.1 |
| 2015/0189130 A1 * | 7/2015 | Milosevski ........ H04N 5/23222 386/224 |
| 2015/0235484 A1 * | 8/2015 | Kraeling .............. G07C 5/0866 701/1 |
| 2015/0318020 A1 * | 11/2015 | Pribula ............ H04N 21/43615 386/227 |
| 2016/0050285 A1 | 2/2016 | von Sneidern et al. |
| 2016/0099023 A1 | 4/2016 | Pacurariu et al. |
| 2016/0165261 A1 | 6/2016 | Nystrom |
| 2017/0064338 A1 | 3/2017 | Martins et al. |
| 2018/0007251 A1 | 1/2018 | Lasher et al. |
| 2018/0173079 A1 * | 6/2018 | Wakamatsu ......... G02B 27/646 |

* cited by examiner

US 10,593,365 B2

METHODS AND SYSTEMS FOR DETERMINING THAT A VIDEO-CAPTURING DEVICE IS UNSTEADY

RELATED DISCLOSURES

This disclosure is a continuation of U.S. patent application Ser. No. 15/295,767 filed on Oct. 17, 2016, which claims priority to U.S. Provisional Patent Application No. 62/242,593, titled "Video Production System with Content-Related Features," filed on Oct. 16, 2015, which are hereby incorporated by reference in their entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) capturing, by a computing system, via a camera of the computing system, video content; (ii) encoding, by the computing system, the captured video content to generate a video stream; and (iii) while generating the video stream: (a) making, by the computing system, a determination that each condition in a condition set is satisfied, wherein the condition set includes a condition relating to a change in a data rate of the video stream; and (b) responsive to making the determination, outputting, by the computing system, via a user interface of the computing system, an indication that the computing system is unsteady.

In another aspect, an example non-transitory computer-readable medium is disclosed. The computer-readable medium has stored thereon program instructions that upon execution by a processor, cause performance of a set of acts including (i) capturing, by a computing system, via a camera of the computing system, video content; (ii) encoding, by the computing system, the captured video content to generate a video stream; and (iii) while generating the video stream: (a) making, by the computing system, a determination that each condition in a condition set is satisfied, wherein the condition set includes a condition relating to a change in a data rate of the video stream; and (b) responsive to making the determination, outputting, by the computing system, via a user interface of the computing system, an indication that the computing system is unsteady.

In another aspect, an example computing system is disclosed. The computing system is configured for performing a set of acts including (i) capturing, via a camera of the computing system, video content; (ii) encoding the captured video content to generate a video stream; and (iii) while generating the video stream: (a) making a determination that each condition in a condition set is satisfied, wherein the condition set includes a condition relating to a change in a data rate of the video stream; and (b) responsive to making the determination, outputting, via a user interface of the computing system, an indication that the computing system is unsteady.

In another aspect, an example method is disclosed. The method includes (i) receiving, by a first computing system, from a second computing system, a video stream generated by the second computing system, the video stream representing video content captured by the second computing system; and (ii) while receiving the video stream: (a) making, by the first computing system, a determination that each condition in a condition set is satisfied, wherein the condition set includes a condition relating to a change in a data rate of the video stream; and (b) responsive to making the determination, causing, by the first computing system, the second computing system to output an indication that the second computing system is unsteady.

In another aspect, an example non-transitory computer-readable medium is disclosed. The computer-readable medium has stored thereon program instructions that upon execution by a processor, cause performance of a set of acts including (i) receiving, by a first computing system, from a second computing system, a video stream generated by the second computing system, the video stream representing video content captured by the second computing system; and (ii) while receiving the video stream: (a) making, by the first computing system, a determination that each condition in a condition set is satisfied, wherein the condition set includes a condition relating to a change in a data rate of the video stream; and (b) responsive to making the determination, causing, by the first computing system, the second computing system to output an indication that the second computing system is unsteady.

In another aspect, an example first computing system is disclosed. The first computing system is configured for performing a set of acts including (i) receiving, from a second computing system, a video stream generated by the second computing system, the video stream representing video content captured by the second computing system; and (ii) while receiving the video stream: (a) making a determination that each condition in a condition set is satisfied, wherein the condition set includes a condition relating to a change in a data rate of the video stream; and (b) responsive to making the determination, causing the second computing system to output an indication that the second computing system is unsteady.

DETAILED DESCRIPTION

I. Overview

Figure 1:
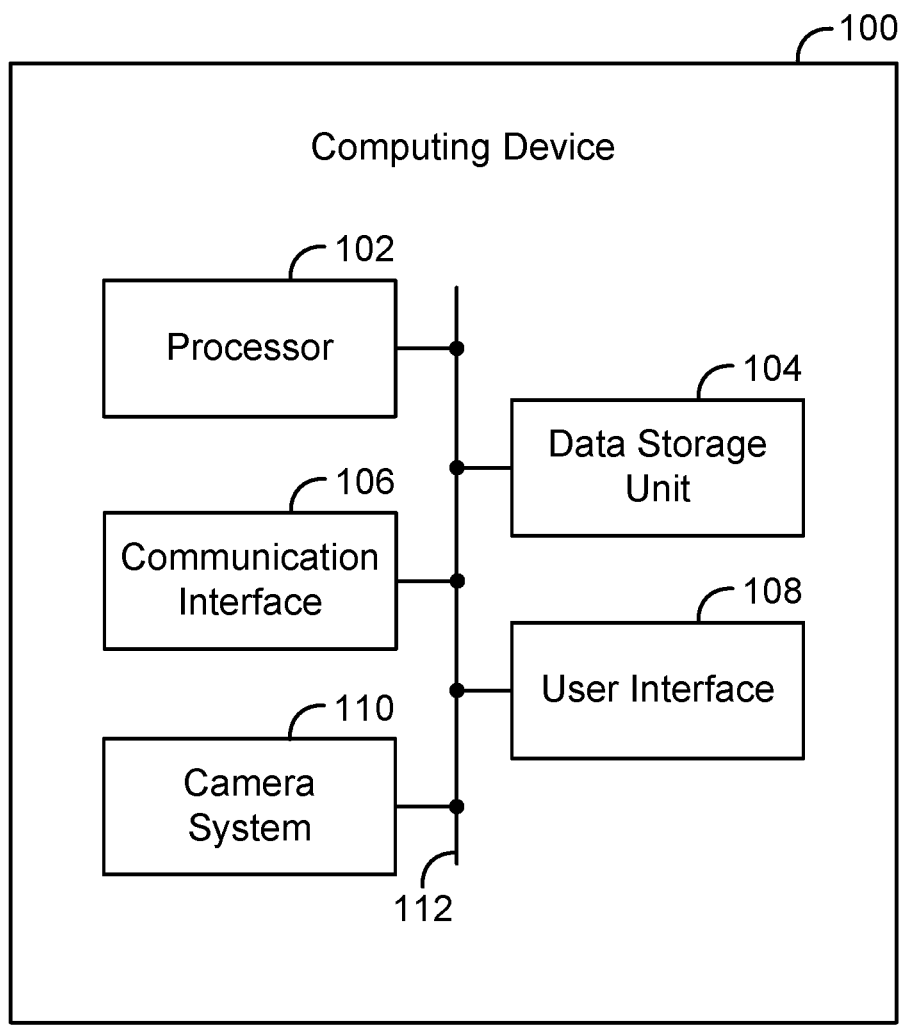
FIG. 1 is a simplified block diagram of an example computing device.

A VPS can generate video content that can serve as or be part of a video program (e.g., a news program). The VPS can then transmit the video content to a video-broadcast system (VBS), which in turn can transmit the video content to an end-user device for presentation of the video content to an end-user.

The VPS can include various components to facilitate generating video content. For example, the VPS can include a video source, a content system, a first DVE system, and a second DVE system.

The video source can generate first video content, and can transmit the first video content to the second DVE system. In one example, the video source can take the form of a video camera directed towards a scene where a news anchor is discussing a news story. Thus, in one example, the process of the video source generating the first video content can involve the video source capturing first video content showing the scene where the news anchor is discussing the news story.

The content system can transmit content, such as a set of images relating to the news story, to the first DVE system. The first DVE system can receive the content, and can execute a DVE, which causes the first DVE system to generate second video content that includes the received content. For example, the generated second video content can show the set of images scrolling from right to left. The first DVE system can then transmit the generated second video content to the second DVE system.

The second DVE system can receive the first video content and the second video content, and can execute a DVE, which causes the DVE system to overlay the second video content on a portion of the first video content, thereby generating third video content. As such, in one example, the third video content can include the scrolling images overlaid on a portion of the scene where the news anchor is discussing the news story. The third video content can serve as or be part of a video program. Thus, in this way, the VPS can integrate content, such as a set of images, into a video program.

The VPS can also include a scheduling system and a sequencing system. The scheduling system can create a program schedule, perhaps based on input received from a user (e.g., a producer or technical director) via a user interface. The sequencing system can process records in the program schedule, and based on the processed records, can control one or more components of the VPS, such as the video source, the content system, the first DVE system, and the second DVE system, to facilitate generating video content, such as in the manner described above.

The VPS can also include an end-user device that can perform various acts and/or functions related to various types of content, perhaps based on input received from a user (e.g., a field reporter) via a user interface. For example, the end-user device can capture video content (e.g., video content of a newsworthy event) via a camera of the end-user device, and can generate and output the video content in the form of a video stream, which the VPS can integrate into a video program.

The end-user device can generate the video stream in various ways. For example, the camera of the end-user device can capture the video content, and an encoder of the end-user device can encode (e.g., compress) the video content to generate a video stream representing the video content, where the video stream can have a particular data rate (e.g., a bit rate). The video stream can be formatted into packets of data, which can be stored temporarily in a memory buffer of the end-user device before the end-user device transmits the packets from the memory buffer to another entity, such as the content system or another component of the VPS.

In some instances, the end-user device can become unsteady while it is generating the video stream. For example, this can be due to the user or another entity shaking the end-user device or otherwise causing excessive motion of the end-user device. While the end-user device is unsteady, it can be more inefficient for the end-user device to encode the video stream, which can lower the quality of the video stream. To help account for this, the end-user device can increase the data rate of the video stream in an attempt achieve desirable video stream quality.

The present disclosure provides a way to help the end-user device notify the user of the end-user device that the end-user device is unsteady, so that the user can then reduce the motion of the end-user device. In particular, to facilitate this, a component of the VPS can analyze the data rate of the video stream, use the analysis as a basis for determining whether the end-user device is unsteady and, if so, responsively causing the end-user device to notify the user in the manner discussed above.

In some implementations, the component that analyzes the data rate can be the end-user device itself, which can be the device owned or operated by the user who is capturing the video content, such as a video camera that can be separate from or included as a component in a computing system (e.g., a smart phone camera). In this context, an example method includes the end-user device capturing video content via a camera and then encoding the captured video content to generate a video stream. The end-user device can capture, encode, and/or generate the video stream in the manner discussed above, or in some other manner.

The example method also includes the end-user device, while generating the video stream, making a determination that each condition in a condition set is satisfied, where the condition set includes a condition relating to a change in a data rate of the video stream. The condition set can include one or more conditions, such as various combinations of the conditions described herein.

In one example, the condition can be that the data rate of the video stream has changed by a threshold amount. To facilitate a determination of whether this condition is satisfied, the end-user device can analyze various portions of the generated video stream. For instance, the end-user device can determine a first data rate for a first portion of the generated video stream and a second data rate for a second portion of the generated video stream, compare the two determined data rates, and determine whether the amount of change between the two determined data rates is greater than the threshold amount. In line with the discussion above, the end-user device determining that there has been a change in the data rate greater than the threshold amount can indicate to the end-user device that the end-user device is unsteady. The end-user device can thus take action to notify the user of the end-user device that the end-user device is unsteady.

Accordingly, the example method further includes the end-user device, while generating the video stream, and responsive to making the determination that each condition in the condition set is satisfied, outputting, via a user interface of the end-user device, an indication that the end-user device is unsteady. The indication can take the form of an audio and/or visual indication, and the user interface can include various components through which the end-user device can output the indication, such as a sound speaker, a display device (e.g., screen), and/or a light source. In one example, the end-user device can display to the user, on the display device of the end-user device, text indicating that the end-user device is unsteady.

In other implementations, the component that analyzes the data rate can be the content system that is receiving the video stream transmission from the end-user device. In these implementations, an example method includes the content system receiving, from the end-user device, a video stream generated by the end-user device. The example method also includes the content system, while receiving the video stream, making a determination that each condition in a condition set is satisfied, where the condition set includes a condition relating to a change in a data rate of the video stream. The condition(s) of the condition set can take various forms, including the example condition described above.

Further, the example method includes the content system, while receiving the video stream, and responsive to making the determination, causing the end-user device to output an indication that the end-user device is unsteady. There are various ways in which the content system can cause the end-user device to output the indication. In one example, the content system can transmit a text message to the end-user device, which the end-user device can then receive and display on a display device (e.g., a display screen) of the end-user device.

These features and related features are described in greater detail below.

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, a user interface 108, and/or a camera system 110. Each of these components can be connected to each other via a connection mechanism 112.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions included in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as an input received via the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet interface or a high-definition serial-digital-interface (HD-SDI). In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

The camera system 110 can include hardware and/or software components that facilitate capturing and processing content (e.g., individual images and/or video content). For example, the camera system 110 can include a camera, a frame grabber, and an encoder. The camera can capture video content in the form of a series of images or "frames," and can then transmit the video content to the encoder. The frame grabber can interface with the camera to assist in capturing the video content, such as by receiving the video content from the camera and then storing the video content and/or transmitting the video content to the encoder. The encoder can receive the video content from the frame grabber (or, in some instances, directly from the camera), encode the video content to generate a video stream, format the video stream into data packets, and transmit the packets of the video stream to a memory buffer (e.g., in the data storage unit 104), which can receive and store the packets. The encoder can encode video content according to various standards. For example, the encoder can encode video content in accordance with the H.264 (MPEG-4 AVC) standard, the MPEG-2 Part 2 standard, or the VP8 standard.

In some implementations, the computing device 100 can also include one or more sensors in the form of a sensor system. For instance, the sensor system can include one or more motion sensors configured to measure motion of the computing device 100, such as an accelerometer and/or a gyroscope.

The computing device 100 can take various forms, such as a workstation terminal, a desktop computer, a laptop, a tablet, a mobile phone, a set-top box, and/or a television.

B. Video System

Figure 2:
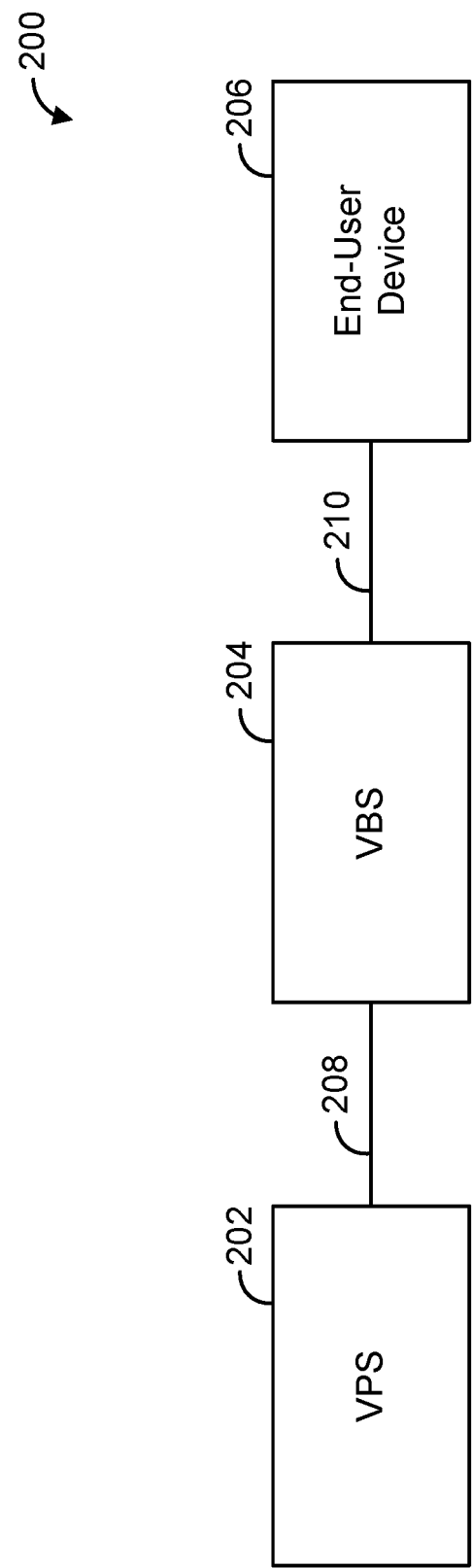
FIG. 2 is a simplified block diagram of an example video system.

FIG. 2 is a simplified block diagram of an example video system 200. The video system 200 can perform various acts and/or functions, and can be implemented as a computing system. In this disclosure, the term "computing system" means a system that includes at least one computing device. In some instances, a computing system can include one or more other computing systems.

The video system 200 can include various components, such as a VPS 202, a VBS 204, and an end-user device 206, each of which can be implemented as a computing system. The video system 200 can also include a connection mechanism 208, which connects the VPS 202 with the VBS 204; and a connection mechanism 210, which connects the VBS 204 with the end-user device 206.

Figure 3:
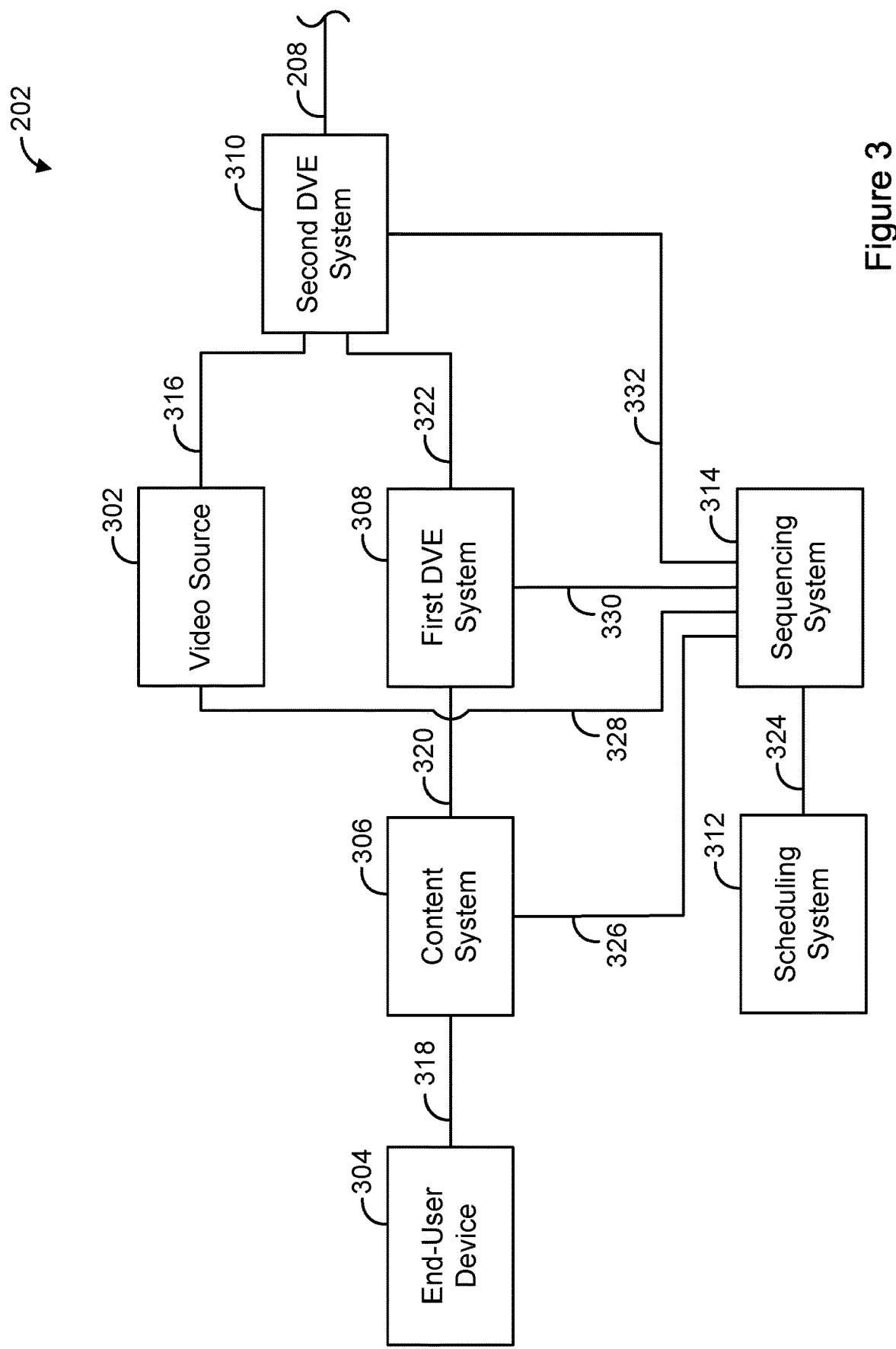
FIG. 3 is a simplified block diagram of an example video-production system (VPS).

FIG. 3 is a simplified block diagram of an example VPS 202. The VPS 202 can include various components, such as a video source 302, an end-user device 304, a content system 306, a first DVE system 308, a second DVE system 310, a scheduling system 312, and a sequencing system 314, each of which can be implemented as a computing system.

The VPS 202 can also include a connection mechanism 316, which connects the video source 302 with the second DVE system 310; a connection mechanism 318, which connects the end-user device 304 with the content system 306; a connection mechanism 320, which connects the content system 306 with the first DVE system 308; a connection mechanism 322, which connects the first DVE system 308 with the second DVE system 310; a connection mechanism 324, which connects the scheduling system 312 with the sequencing system 314; a connection mechanism 326, which connects the sequencing system 314 with the content system 306; a connection mechanism 328, which connects the sequencing system 314 with the video source 302; a connection mechanism 330, which connects the sequencing system 314 with the first DVE system 308; and a connection mechanism 332, which connects the sequencing system 314 with the second DVE system 310.

The video source 302 can take various forms, such as a video camera, a video server, a satellite receiver, or a DVE system. An example video server is the K2 server provided by Grass Valley of San Francisco, Calif.

The end-user device 304 can take various forms. In practice, the VPS 202 is likely to include a large number of end-user devices 304 and corresponding connection mechanisms, each connecting a respective one of the end-user devices 304 with the content system 306. The content system 306 can also take various forms.

The first DVE system 308 can take various forms. An example first DVE system is VIZ TRIO provided by Viz Rt of Bergen, Norway. Another example first DVE system is CASPAR CG provided by the Swedish Broadcasting Corporation.

The second DVE system 310 can take various forms, such as a production switcher. An example production switcher is VISION OCTANE provided by Ross Video Ltd. of Iroquois, Ontario in Canada.

The scheduling system 312 can take various forms. An example scheduling system is WO TRAFFIC provided by WideOrbit, Inc. of San Francisco, Calif. Another example scheduling system is OSI-TRAFFIC provided by Harris Corporation of Melbourne, Fla. A scheduling system is sometimes referred to in the industry as a "traffic system."

The sequencing system 314 can take various forms. A sequencing system is sometimes referred to in the industry as a "production automation system."

Referring back to FIG. 2, the VBS 204 can include various components, such as a terrestrial antenna and/or a satellite transmitter, each of which can be implemented as a computing system.

Each of the video-based entities described in this disclosure can include or be integrated with a corresponding audio-based entity. Also, the video content described in this disclosure can include or be integrated with corresponding audio content.

III. Example Operations

The video system 200 and/or components thereof can perform various acts and/or functions. Examples of these and related features will now be described.

The video system 200 can perform various acts and/or functions related to video content. For example, the video system 200 can receive, generate, output, and/or transmit video content that can serve as or be part of a video program (e.g., a news program). In this disclosure, the act of receiving, generating, outputting, and/or transmitting video content can occur in various ways and/or according to various standards. For example, the act of receiving, outputting, and/or transmitting video content can include receiving, outputting, and/or transmitting a video stream representing the video content, such as over Internet Protocol (IP) or in accordance with the high-definition serial digital interface (HD-SDI) standard. Likewise, the act of generating video content can include generating a video stream representing the video content. Also, the act of receiving, generating, outputting, and/or transmitting video content can include receiving, generating, outputting, and/or transmitting an encoded or decoded version of the video content.

The VPS 202 can perform various acts and/or functions related to video content production. For example, the VPS 202 can generate and/or output video content, and can transmit the video content to another entity, such as the VBS 204.

Referring again to FIG. 3, the video source 302 can generate and/or output video content, and can transmit the video content to another entity, such as the second DVE system 310. In practice, the VPS 202 is likely to include multiple video sources 302 and corresponding connection mechanisms, each connecting a respective one of the video sources 302 with the second DVE system 310.

As noted above, in one example, the video source 302 can take the form of a video camera. In one example, the video camera can be directed towards a scene where a news anchor is discussing a news story. Thus, in one example, the process of the video source 302 generating video content can involve the video source 302 capturing video content showing the scene where the news anchor is discussing the news story.

As noted above, in another example, the video source 302 can take the form of a video server. A video server can record and/or store video content (e.g., in the form of a file). Further, the video server can retrieve stored video content and can use the retrieved video content to generate and/or output a video stream representing the video content. This is sometimes referred to in the industry as the video server "playing out" the video content. The video server can then transmit the video stream, thereby transmitting the video content, to another entity, such as the second DVE system 310.

The end-user device 304 can perform various acts and/or functions related to various types of content, perhaps based on input received from a user (e.g., a field reporter) via a user interface. For example, the end-user device 304 can capture content (e.g., an image and/or video content) via a camera of the end-user device 304. This can allow the end-user device 304 to capture content of a newsworthy event so that the VPS 202 can integrate the content into a video program.

The end-user device 304 can also store content in a data storage unit (e.g., a data storage unit of the end-user device 304). At a later time, the end-user device 304 can select and/or retrieve the stored content, and can transmit it to another entity, such as the content system 306.

In the case where the end-user device 304 is using a camera to capture video content, in one example, proximate the time that the end-user device 304 is capturing the content (i.e., without significant delay), the end-user device 304 can transmit the captured video content to the content system 306. This is sometimes referred to in the industry as a "live video transmission" or a "live video stream." Similarly, each of the other entities within the VPS 202 and the VBS 204 can receive content and, proximate the time that the content is being received, generate, output, and/or transmit content to the next entity in the video production path. This can allow for live video transmission through all or part of the video system 200, as desired.

In the case where the end-user device 304 uses a camera to capture content, the end-user device 304 can also generate metadata of the captured content. In one example, the end-user device 304 can generate this metadata proximate a time that the end-user device 304 captures the content.

In one example, the metadata can represent a time at which the end-user device 304 captured at least a portion of the content. For instance, in the case where the content is an image, the metadata can represent a time at which the end-user device 304 captured the image. Alternatively, in the case where the content is video content, the metadata can represent a time at which the end-user device 304 started capturing the video content.

In another example, the metadata can represent a location of the end-user device 304 proximate a time when the end-user device 304 captured at least a portion of the content. For instance, in the case where the content is an image, the metadata can represent a location at which the end-user device 304 captured the image. Alternatively, in the case where the content is video content, the metadata can represent a location at which the end-user device 304 started capturing the video content, or a location at which the end-user device 304 captured a given portion of the video content. In some cases, the metadata can represent multiple locations, with each location representing a location of the end-user device 304 proximate a time when the end-user device 304 captured a respective portion of the video content. Metadata representing a location of the end-user device 304 can take various forms. For example, the metadata can take the form of global positioning system (GPS) coordinates.

The end-user device 304 can store metadata in a data storage unit (e.g., a data storage unit of the end-user device 304), perhaps in a manner that associates the metadata with its corresponding content. At a later time, the end-user device 304 can select and/or retrieve the stored content, and can transmit it to another entity, such as the content system 306. In some examples, in the case where the end-user device 304 performs an operation in connection with content, the end-user device 304 can perform a parallel operation in connection with the metadata of that content. For example, if the end-user device 304 selects, retrieves, and transmits content to the content system 306, the end-user device 304 can also select, retrieve, and transmit the metadata of the content to the content system 306.

Like the end-user device 304, the content system 306 can perform various acts and/or functions related to content, perhaps based on input received from a user (e.g., a producer or technical director) via a user interface. For example, the content system 306 can receive content and can do so in various ways. In one example, the content system 306 can receive content from another entity, such as the end-user device 304.

The content system 306 can also store, select, and/or retrieve content. As such, the content system 306 can store received content in a data storage unit (e.g., a data storage unit of the content system 306), and can then receive the content by selecting and retrieving it from the data storage unit.

The content system 306 can also modify content, and can do so in various ways. Among other things, this can allow the content system 306 to remove vulgarities, personal information, and/or extraneous information that is not suitable or desirable for integration into a video program.

The content system 306 can also transmit content to another entity, such as the first DVE system 308. In this disclosure, receiving and transmitting content can include forwarding the content. Alternatively, receiving and transmitting content can include receiving the content and transmitting a copy of the content. As such, in one example, the content system 306 can receive content from the end-user device 304, and can transmit a copy of the content to the first DVE system 308.

As with the end-user device 304, in the case where the content system 306 performs an operation in connection with content, the content system 306 can perform a parallel operation in connection with the metadata of that content. For example, the content system 306 can modify metadata by adding a unique identification number to the metadata to facilitate managing the corresponding content. The content system 306 can use metadata for various reasons. For example, the content system 306 can receive search terms and can match the search terms to metadata for the purposes of searching for and/or selecting relevant content.

The first DVE system 308 can perform various acts and/or functions related to a DVE, perhaps based on input received from a user (e.g., a producer or technical director) via a user interface. For example, the first DVE system 308 can perform a set of steps based on a DVE template to generate and/or output video content. This is sometimes referred to in the industry as "executing a DVE."

The first DVE system 308 can create and/or modify a DVE template. Further, the first DVE system 308 can store and/or retrieve a DVE template. As such, the first DVE system 308 can store a DVE template in a data storage unit (e.g., a data storage unit of the first DVE system 308), and can then receive the DVE template by selecting and retrieving it from the data storage unit.

In some instances, the first DVE system 308 can use the DVE template and content to generate and/or output video content that includes the content. The first DVE system 308 can receive content to use for this purpose in various ways. For example, the first DVE system 308 can receive content from another entity, such as the content system 306. In another example, the first DVE system 308 can receive content by selecting and retrieving it from a data storage unit (e.g., a data storage unit of the content system 306).

A DVE template can specify how the first DVE system 308 is to receive content. In one example, a DVE template can do so by specifying that the first DVE system 308 is to receive content on a particular input of the first DVE system 308 (e.g., an input that maps to a particular entity, such as the content system 306). In another example, a DVE template can do so by specifying that the first DVE system 308 is to receive content by retrieving it from a particular location of a particular data storage unit (e.g., a data storage unit of the first DVE system 308).

After the first DVE system 308 generates and/or outputs video content, the first DVE system 308 can transmit the video content to another entity, such as the second DVE system 310, and/or can store the video content in a data storage unit (e.g., a data storage unit of the first DVE system 308). As such, in one example, the first DVE system 308 can receive content, can use the content to generate and/or output video content that includes the content, and can transmit the video content to the second DVE system 310.

A DVE template can be configured in various ways and can specify various aspects of a DVE. For example, the DVE template can specify a set of ordered steps and various timing aspects, such as when each step is to start being performed and for how long each step is to be performed. The steps can relate to retrieving and/or arranging content within a specified frame or specified frames of video content. The DVE template can specify that a given step is to start being performed at a predefined time, or that a given step is to start being performed at the occurrence of, or after a time offset from the occurrence of, a particular event, such as the conclusion of the performance of a previous step. In another example, the occurrence of the particular event can be the receipt of input from a user via a user interface. In another example, the occurrence of the particular event can be the receipt of an instruction from the sequencing system 314.

To illustrate various aspects of a DVE, an example DVE will now be discussed. In connection with this example, the first DVE system 308 can execute a DVE that causes the first DVE system 308 to generate video content showing overlay images A, B, C, and D scrolling from right to left over a background image. FIGS. 4A-4D are simplified depictions of example frames of the generated video content at various states of the DVE execution process.

Figure 4A:
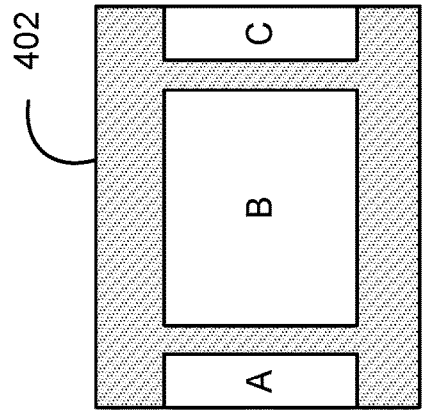
FIG. 4A is a simplified diagram of an example frame of video content, resulting from the performance of a first step in connection with a digital-video effect (DVE).

During a first time period, the first DVE system 308 can perform a first step that involves "moving" from right to left, images A and B until image A is positioned over a center region of the background image. FIG. 4A is a simplified depiction of an example frame 400 at the end of the first time period.

Figure 4B:
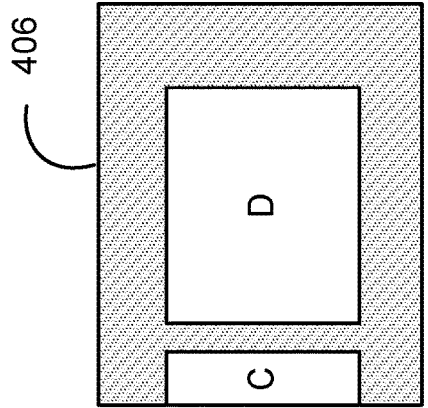
FIG. 4B is a simplified diagram of an example frame of video content, resulting from the performance of a second step in connection with the DVE.

During a next, second time period, the first DVE system 308 can perform a second step that involves "moving" from right to left, images A, B, and C until image B is positioned over the center region of the background image. FIG. 4B is a simplified depiction of an example frame 402 at the end of the second time period.

Figure 4C:
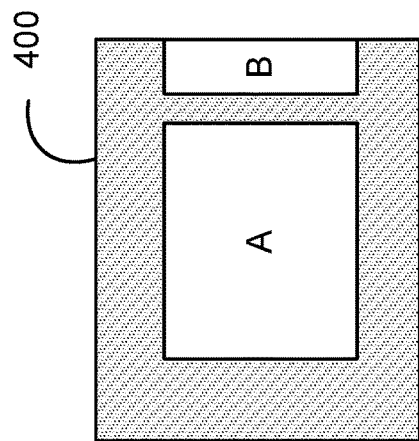
FIG. 4C is a simplified diagram of an example frame of video content, resulting from the performance of a third step in connection with the DVE.

During a next, third time period, the first DVE system 308 can perform a third step that involves "moving" from right to left, images A, B, C, and D until image C is positioned over the center region of the background image. FIG. 4C is a simplified depiction of an example frame 404 at the end of the third time period.

Figure 4D:
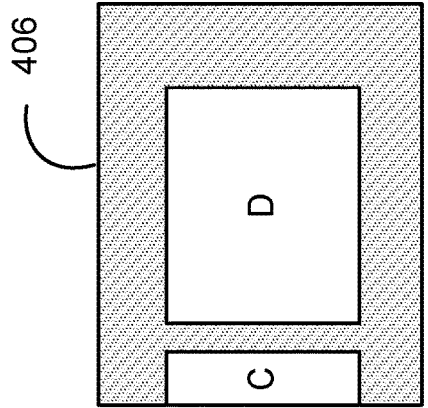
FIG. 4D is a simplified diagram of an example frame of video content, resulting from the performance of a fourth step in connection with the DVE.

During a next, fourth time period, the first DVE system 308 can perform a fourth step that involves "moving" from right to left, images B, C, and D until image D is positioned over the center region of the background image. FIG. 4D is a simplified depiction of an example frame 406 at the end of the fourth time period.

As noted above, the DVE template can specify various timing aspects, such as when each step is to start being performed and for how long each step is to be performed. As such, in one example, the DVE template can specify that each step is to be performed for two seconds. Further, the DVE template can specify that the first DVE system 308 is to start performing the first step at a particular time, and that each of steps two, three, and four are to start being performed five seconds after the performance of the previous step has concluded.

As such, at the start time, the first DVE system 308 can begin performing the first step. Two seconds later, the first DVE system 308 can conclude performing the first step (resulting in the generation of frame 400). Five seconds later, the first DVE system 308 can begin performing the second step. Two seconds later, the first DVE system 308 can conclude performing the second step (resulting in the generation of frame 402). Five seconds later, the first DVE system 308 can begin performing the third step. Two seconds later, the first DVE system 308 can conclude performing the third step (resulting in the generation of frame 404). Five seconds later, the first DVE system 308 can begin performing the fourth step. Two seconds later, the first DVE system 308 can conclude performing the fourth step (resulting in the generation of frame 406). Collectively, this results in the each of the images A, B, C, and D scrolling from left to right, but with each image "pausing" in the center region for five seconds before continuing to move left.

It should be appreciated that the first DVE system 308 can execute a wide variety of different types of DVEs, and can thus generate a wide variety of different types of video content. Among other things, a DVE can involve inserting, moving, removing, overlaying, and/or scaling various different types of content, such as text, images, and/or video content, to generate resulting video content.

Like the first DVE system 308, the second DVE system 310 can perform various acts and/or functions related to a DVE, perhaps based on input received from a user (e.g., a producer or technical director) via a user interface. For example, the second DVE system 310 can perform the acts and/or functions described above in connection with the first DVE system 308, but varied as appropriate for use with the second DVE system 310 instead of the first DVE system 308.

Generally, the first DVE system 308 executes certain types of DVEs, and the second DVE system 310 executes other types of DVEs, namely those that are more suited to be executed further downstream in the video production process. However, various DVE-related configurations are possible. For example, either the first DVE system 308 or the second DVE system 310 can perform the acts and/or functions described herein as being performed by the other of the two systems. In another example, the VPS 202 can instead include a single DVE system that provides the functionality of both the first DVE system 308 and the second DVE system 310.

The second DVE system 310 can receive content in various ways. For example, the second DVE system 310 can receive content from another entity, such as the video source 302 and/or the first DVE system 308. In another example, the second DVE system 310 can receive content by selecting and retrieving it from a data storage unit (e.g., a data storage unit of the second DVE system 310).

The second DVE system 310 can execute a DVE based on a DVE template. The DVE template can specify how the second DVE system 310 is to receive content. In one example, the DVE template can do so by specifying that the second DVE system 310 is to receive content on a particular input of the second DVE system 310 (e.g., an input that maps to a particular entity, such as the video source 302 or the first DVE system 308). In another example, the DVE template can do so by specifying that the second DVE system 310 is to receive content by retrieving it from a particular location of a particular data storage unit (e.g., a data storage unit of the second DVE system 310).

As noted above, a DVE template can be configured in various ways. As such, the second DVE system 310 can execute various types of DVEs. In one example, a DVE template can specify that the second DVE system 310 is to receive first video content from the video source 302 and second video content from the first DVE system 308, and is to overlay the received second video content on a portion of the received first video content, thereby generating third video content.

Figure 5A:
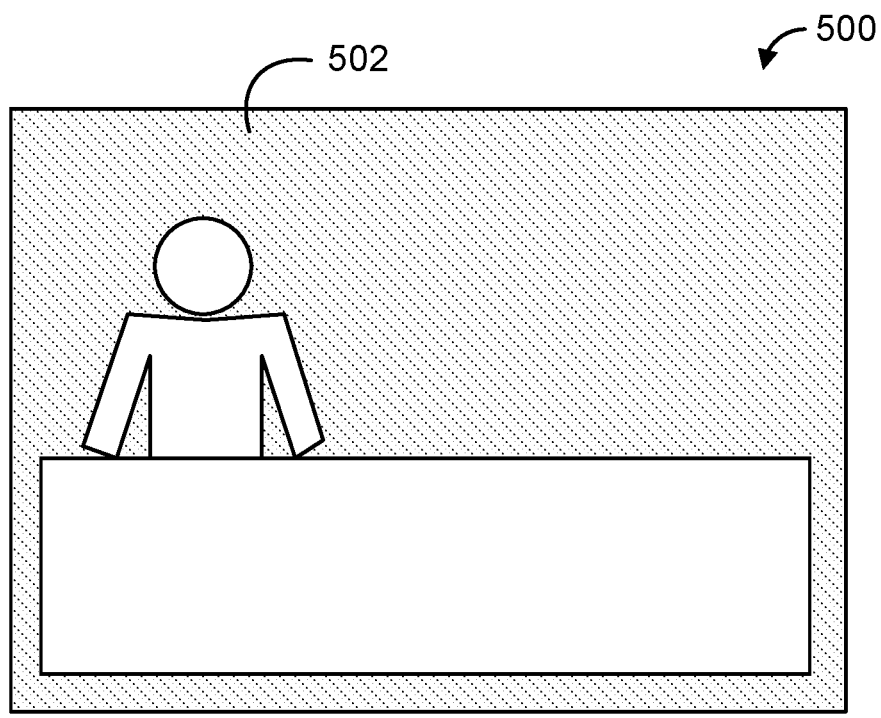
FIG. 5A is a simplified diagram of an example frame of video content, without content overlaid thereon.
Figure 5B:
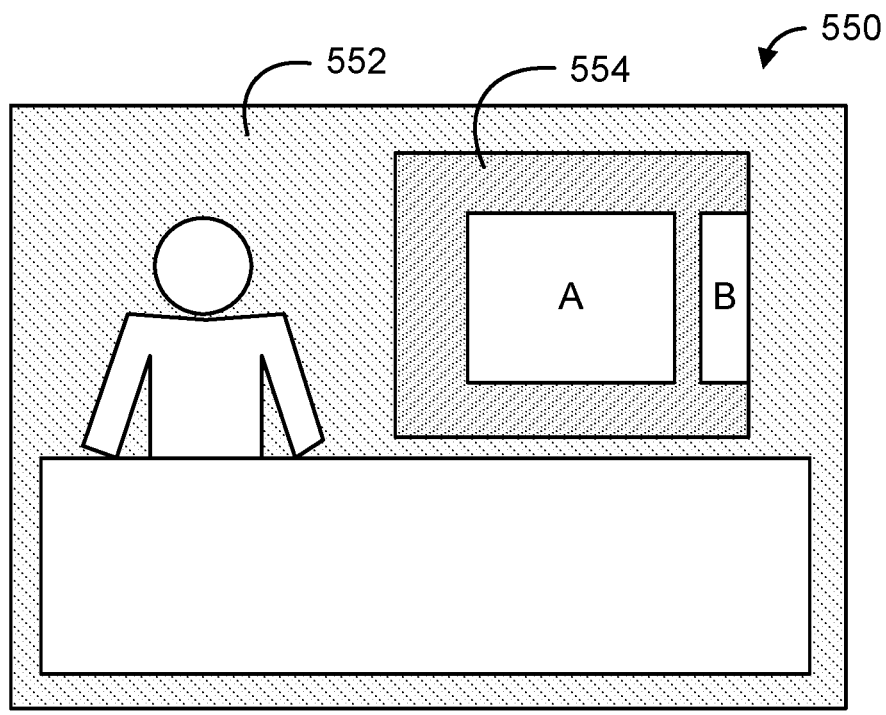
FIG. 5B is a simplified diagram of another example frame of video content, with content overlaid thereon.

FIGS. 5A and 5B help illustrate the concept of overlaying video content on other video content. FIG. 5A is a simplified depiction of an example frame 500 of video content. Frame 500 shows content 502, which is a scene where a news anchor is discussing a news story, but does not include other content overlaid on content 502. For comparison, FIG. 5B is a simplified depiction of another example frame 550 of video content. Frame 550 includes content 552, which is also a scene where a news anchor is discussing a news story, but further includes other content 554 overlaid on a portion of the content 552. In this example, the content 554 shows scrolling images related to the news story, and is overlaid on a portion of the scene where the news anchor is discussing the news story.

After the second DVE system 310 generates and/or outputs the video content, the second DVE system 310 can transmit the video content to another entity, such as the VBS 204, and/or can store the video content in a data storage unit (e.g., a data storage unit of the second DVE system 310).

As discussed above, in one example, the second DVE system 310 can receive first video content that includes content, and can use the first video content to generate and/or output second video content that also includes the content. The second video content can then serve as or be part of a video program. As such, this is an example way in which the VPS 202 can integrate content into a video program.

However, the VPS 202 can also integrate content into a video program in other ways. For example, in the case where the video source 302 is a video camera, the first DVE system 308 can generate video content and can transmit the generated video content to a display device located within a field of the view of the video camera. This can allow the video camera to capture video content that includes the generated video content as it is displayed on the display device. Then, by integrating the captured video content into a video program, the VPS 202 can therefore also integrate the generated video content displayed on the display device, into the video program.

In one example, the display device can be integrated with a touch-sensitive panel, which can allow a user (e.g., a news anchor) to interact with the content. To facilitate the user's interaction with the content, the display device and/or related components can perform particular acts and/or functions in response to a user providing certain touch commands.

In one example, the display device can initially display multiple small tiles, each representing a different content item. The position and ordering of the small tiles can be determined by a DVE template, which can specify that certain touch commands cause the display device to perform certain acts and/or functions in connection with the displayed content items. For example, if a user taps on one of the small items a first time, the display device can show the content item in an enlarged view and perhaps show additional elements of, or information associated with, the content item. As the user interacts with the content items displayed on the display device, the video camera can generate video content including these interactions and thereby integrate the content items into the video program.

The scheduling system 312 can perform various acts and/or functions related to the scheduling of video content production, perhaps based on input received from a user (e.g., a producer or technical director) via a user interface. For example, the scheduling system 312 can create and/or modify a program schedule. Further, the scheduling system 312 can store and/or retrieve a program schedule. As such, the scheduling system 312 can store a program schedule in a data storage unit (e.g., a data storage unit of the scheduling system 312), and can then receive the program schedule by selecting and retrieving it from the data storage unit. The scheduling system 312 can also transmit a program schedule to another entity, such as the sequencing system 314.

The sequencing system 314 can process records in the program schedule perhaps based on input received from a user (e.g., a producer or technical director) via a user interface. This can cause the sequencing system 314 to control one or more other components of the VPS 202 to facilitate the VPS 202 generating and/or outputting video content, which can serve as or be part of a video program. For example, the sequencing system 314 can control the video source 302, the content system 306, the first DVE system 308, and/or the second DVE system 310 to perform various acts and/or functions, such as those described in this disclosure.

The sequencing system 314 can receive a program schedule in various ways. For example, the sequencing system 314 can do so by receiving it from another entity, such as the scheduling system 312. In another example, the sequencing system 314 can do so by selecting and retrieving it from a data storage unit (e.g., a data storage unit of the scheduling system 312).

A program schedule (sometimes referred to in the industry as a "rundown") serves as a schedule or outline of a video program and can include multiple records. A video program can be conceptually divided into multiple logically-separated portions, sometimes referred to in the industry as "stories." As such, each portion of the video program can be represented by a separate record of the program schedule. In some cases, each record can also include one or more sub-records. Each record (including a sub-record) can include various types of data.

In some instances, the sequencing system 314 can process a next record in the program schedule based on a trigger event. In one example, the trigger event can be the sequencing system 314 completing one or more actions related to a current record in the program schedule. In another example, the trigger event can be the sequencing system 314 receiving input from a user via a user interface.

Referring back to FIG. 2, the VBS 204 can receive video content from the VPS 202, which in turn can transmit the video content to the end-user device 206 for presentation of the video content to an end user. In practice, the video system 200 is likely to include a large number of these end-user devices 206 and corresponding connection mechanisms, each connecting the VBS 204 with a respective one of the end-user devices 206. Thus, in practice, the VBS 204 can transmit video content to a large number of end-user devices 206 for presentation of the video content to a large number of end users.

The VBS 204 can transmit video content to the end-user device 206 in various ways. For example, VBS 204 can transmit video content to the end-user device 206 over-the-air or via a packet-based network such as the Internet. The end-user device 206 can receive video content from the VBS 204, and can present the video content to an end user via a user interface.

As discussed above, a computing system such as end-user device 304 can generate a video stream. For example, a camera of the end-user device 304 can capture video content in the form of a series of frames, and an encoder of the end-user device 304 can encode the video content to generate a video stream having a particular data rate. The encoder can also format the video stream into data packets and can transmit the packets to a memory buffer of the end-user device 304, which in turn can receive and temporarily store the packets. The end-user device 304 can then at some point in time (e.g., in real-time, with minimal or no delay, while capturing the video content) transmit the packets from the memory buffer to another entity of the VPS 202, such as the content system 306.

A data rate of a video stream refers to an amount of data of the video stream that is streamed per unit of time. In some instances, a data rate of a video stream can take the form of a "bit rate" of the video stream, which is the number of bits of the video stream that are streamed per unit of time, and which is quantified using units such as bits per second (bit/s, or bps). For example, a video stream having a bit rate of 500 kilobits per second (kbps) means that each second of the video stream contains 500 kilobits of data (i.e., the video stream is streamed at a rate of 500 kilobits per second).

A data rate of a video stream can affect various properties of the video stream, such as the quality (e.g., the resolution of each individual frame) and size (i.e., the amount of data required to represent the video stream) of the video stream, as well as the rate at which the video stream takes up space in the memory buffer.

As discussed above, the end-user device 304 can become unsteady while it is generating the video stream. The end-user device 304 can become unsteady in various ways, such as when the user or another force shakes or otherwise excessively moves the end-user device 304. The unsteadiness of the end-user device 304 can cause the camera's view of the scene to change such that the scene captured by the camera appears in one location in one frame of the video content, but then appears in a different location in the subsequent frame of the video content. Further, because the scene can change locations between subsequent frames, at least a portion of the pixels representing the captured scene can change locations between subsequent frames. Because video encoding techniques involve, among other things, indicating relative changes between subsequent frames to reduce the data required to represent a given video content item, video content that includes rapid motion, frequent scene changes, or other effects that cause the scene to change rapidly in time are generally less efficiently encoded. Thus, unsteadiness of end-user device 304 can make it more inefficient for the encoder of the end-user device 304 to encode the video stream, which can lower the quality of the video stream. Therefore, the end-user device 304 can increase the data rate of the video stream to account for the change in pixel locations between subsequent frames that make encoding less efficient and thereby attempt to increase the quality of the video stream (and/or maintain the quality of the video stream at a predetermined level).

To help minimize the time during which the end-user device 304 is unsteady, it can be desirable to efficiently determine that the end-user device 304 is unsteady and responsively notify the user of the end-user device 304 so that the user can steady the end-user device 304. Accordingly, the present disclosure provides methods for accomplishing this—namely, by utilizing the data rate of the video stream generated by the end-user device 304.

In some instances, the end-user device 304 itself can perform various acts and/or functions relating to help determine that the end-user device 304 is unsteady and responsively notify the user of the end-user device 304. These acts and/or functions and related features will now be described.

First, the end-user device 304 can capture video content and encode the video content to generate a video stream representing the video content, which the end-user device 304 can do in various ways as described above.

While the end-user device 304 is generating the video stream, the end-user device 304 can make a determination that each condition in a condition set is satisfied, where the condition set includes a condition relating to a change in a data rate of the video stream.

The condition may take a variety of forms. In one example, the condition can be that the data rate of the video stream has changed by a threshold amount. To determine whether this condition has been satisfied, while the end-user device 304 is generating the video stream, the end-user device 304 can select a first portion of the video stream and a second, different portion of the video stream, determine a first data rate for the first portion and a second data rate for the second portion, and determine whether an amount of change between the two determined data rates is greater than the threshold amount. If the end-user device 304 determines that the change is greater than the threshold amount, the end-user device 304 can responsively then determine that the condition is satisfied, which can indicate that the end-user device is unsteady.

In another example, the condition can be that the determined first data rate is less than a first threshold data rate and the determined second data rate is greater than a second threshold data rate. To determine whether this condition has been satisfied, while the end-user device 304 is generating the video stream, the end-user device 304 can select a first portion of the video stream and a second, different portion of the video stream, determine a first data rate for the first portion and a second data rate for the second portion, as discussed above. The end-user device 304 can then compare the determined first data rate to a first threshold data rate, and can compare the determined second data rate to a second threshold data rate. If the end-user device 304 determines that the determined first data rate is less than the first threshold data rate and the determined second data rate is greater than the second threshold data rate, the end-user device 304 can responsively then determine that the condition is satisfied, which can indicate that the end-user device is unsteady.

In some aspects, the act of the end-user device 304 selecting a first portion of the video stream and a second, different portion of the video stream can involve selecting a first time window of the video stream (e.g., three seconds of the video stream) and selecting a second, different time window of the video stream (e.g., a different three seconds of the video stream). The first and second time windows can have the same or different durations. For example, the first time window can be three seconds, and the second time window can be three seconds as well (albeit a different three second window of the video stream). As another example, the first time window can be three seconds, and the second time window can be six seconds.

In other aspects, the act of the end-user device 304 selecting a first portion of the video stream and a second, different portion of the video stream can involve selecting a first series of frames of the video stream and selecting a second, different series of frames of the video stream. The first series of frames and the second, different series of frames can each include the same quantity of frames or a different quantity of frames. For example, the first series of frames can include ninety frames, and the second series of frames can include ninety frames as well (albeit a different sequence of ninety frames of the video stream). As another example, the first series of frames can include ninety frames, and the second series of frames can include one hundred and twenty frames.

The act of the end-user device 304 selecting a first portion of the video stream and a second, different portion of the video stream can involve selecting the first portion and the second portion such that the two portions include a common portion of the video stream. To illustrate this, consider an example scenario in which the video stream includes one hundred and twenty frames. In this scenario, the end-user device 304 can select a first portion of the video stream that includes a first series of frames, shift over to a different portion of the video stream by a certain amount, and then select a second portion of the video stream that includes a second series of frames. For instance, the end-user device 304 can select a first portion of the video stream that includes frames one through ninety, shift over by thirty frames, and then select a second portion of the video stream that includes frames thirty-one through one hundred and twenty. As such, both the first portion and the second portion include a common portion of frames thirty-one to ninety.

Further, consider for example, in this scenario, that the condition is that the determined first data rate is less than a first threshold data rate and the determined second data rate is greater than a second threshold data rate. In view of this, the end-user device 304 can determine a first data rate for frames one through ninety (i.e., the amount of data per second of the first series of ninety frames), and determine a second data rate for frames thirty-one through one hundred and twenty (i.e., the amount of data per second of the second series of ninety frames). The end-user device 304 can then determine whether the condition is satisfied in one or more of the manners discussed above.

In some aspects, the act of the end-user device 304 determining whether the condition relating to a change in a data rate of the video stream is satisfied can involve the end-user device 304 selecting more than two portions of the video stream, determining respective data rates for each portion, and then determining whether the condition has been satisfied in one or more of the manners discussed above.

The end-user device 304 can select the thresholds discussed above in various ways. For instance, the end-user device 304 can select the thresholds based on the encoding standard used by the encoder for generating the video stream. As an example, consider the scenario discussed above in which the end-user device 304 compares the first data rate of the first portion to a first threshold and compares the second data rate of the second portion to a second threshold. In this scenario, if the end-user device 304 determines that the encoder is using the H.264 encoding standard, the end-user device 304 can responsively use a first threshold data rate having a value in a range of 300 kbps to 400 kbps (e.g., 350 kbps), and use a second threshold data rate having a value in a range of 600 kbps to 700 kbps (e.g., 650 kbps). As another example, consider the scenario discussed above in which the end-user device 304 determines whether the change in the data rate is at least a threshold amount. In this scenario, if the end-user device 304 determines that the encoder is using the H.264 encoding standard, the end-user device 304 can responsively use a threshold amount having a value in a range of 250 kbps to 350 kbps (e.g., 300 kbps). Other examples are possible as well, and other thresholds discussed herein can be predefined or selected in a similar manner.

As noted above, the first portion of the video stream and the second, different portion of the video stream can take the form of a first series of frames and a second, different series of frames, each including the same quantity of frames. In some aspects, the end-user device 304 can select the quantity of frames for the first and second portions based on the encoding standard. As an example, if the end-user device 304 determines that the encoder is using the H.264 encoding standard, the end-user device 304 can responsively select the quantity of frames to be a value in a range of 80 frames to 100 frames (e.g., 90 frames), such that the first and second portions each include the quantity of frames. The end-user device 304 can select the quantity of frames in other manners as well.

The condition set can include other conditions as well, additionally or alternatively to the condition relating to a change in a data rate of the video stream. In some aspects, the end-user device 304 can include one or more sensors configured to measure motion of the end-user device 304, such as an accelerometer configured to measure acceleration involved in the motion of the end-user device 304, or a gyroscope configured to measure the orientation of the end-user device 304, as noted above. As the end-user device 304 moves unsteadily, the acceleration and/or orientation data obtained via one or more of these sensors can change. The end-user device 304 can thus monitor these changes to help determine whether the end-user device 304 is unsteady.

As such, the condition set can include a condition relating to data (i.e., measurements) obtained via one or more of these sensors. For instance, the condition set can include a condition relating to accelerometer data obtained via the accelerometer of the end-user device 304. In one example, the condition can be that the determined accelerometer data (e.g., an indication of the magnitude of the acceleration of the end-user device 304 over a given time period) is at least a threshold value. If the end-user device 304 determines that the accelerometer data is at least the threshold value, the end-user device 304 can determine that the condition is satisfied, which can indicate that the end-user device is unsteady.

In another example, the condition can relate to a change in the accelerometer data. To facilitate this, the end-user device 304 can determine first accelerometer data from a first point in time during the end-user device's motion and determine second accelerometer data from a second point in time during the end-user device's motion. The first and second points in time can be close together (e.g., one second apart or less) or far apart (e.g., greater than one second apart). In one aspect, the end-user device 304 can then compare the determined data to determine whether a change from the first accelerometer data to the second accelerometer data is at least a threshold amount. In this aspect, if the end-user device 304 determines that the change is at least a threshold amount, the end-user device 304 can determine that the condition is satisfied, which can indicate that the end-user device is unsteady.

Alternatively, in another aspect, the end-user device 304 can compare the first accelerometer data to a first threshold and can compare the second accelerometer data to a second threshold. In this aspect, if the end-user device 304 determines that the first accelerometer data is less than the first threshold and determines that the second accelerometer data is greater than the second threshold, the end-user device 304 can determine that the condition is satisfied, which can indicate that the end-user device is unsteady.

Other examples of conditions relating to sensor data are possible as well, such as comparing gyroscope data (e.g., an indication of the extent of change in orientation of the end-user device 304 over a given time period) to one or more thresholds similar to the approach outlined for accelerometer data above.

As discussed above, in response to the end-user device 304 making the determination that each condition in the condition set is satisfied, the end-user device 304 can output, via a user interface of the end-user device 304 (e.g., user interface 108), an indication that the end-user device 304 is unsteady. The user interface of the end-user device 304 can include various components through which the end-user device 304 can output the indication, such as a sound speaker, a display device, and/or a light source other than the display device (e.g., a light-emitting diode (LED) light source integrated with the end-user device's camera).

The indication can take various forms, such as an audio indication, a visual indication, or a combination of an audio and visual indication. In one example, the indication can be one or more tones (e.g., beeps) played out of the sound speaker of the end-user device 304, each tone having a particular pitch and volume suitable for alerting the user of the end-user device 304. In another example, the indication can be a light flashed a single time or repeatedly by the light source of the end-user device 304. In another example, the indication can be a message displayed on the display device of the end-user device 304. For instance, the message can include text stating "The device is unsteady" and/or "Hold the device steady." Other examples are possible as well.

In some aspects, while generating the video stream, the end-user device 304 can use the display device to display a preview of the video content that is being generated and streamed in the form of the video stream. In particular, the display device can act as a preview window, and the end-user device 304 can display the video content in the preview window. In these aspects, the act of the end-user device 304 outputting the indication can involve displaying the indication in the preview window such that the indication is overlaid on the video content. This can allow the end-user device 304 to notify the user that the end-user device 304 is unsteady while the user is watching the preview of the video content in the preview window.

In some aspects, the act of the end-user device 304 outputting the indication can involve outputting the indication for a predefined time period. The predefined time period can begin immediately once the end-user device 304 determines that each condition of the condition set is satisfied, or the predefined time period can begin at a later time. In these aspects, the end-user device 304 can then at some point make a determination that the predefined time period has elapsed and, in response to making the determination that the predefined time period has elapsed, the end-user device 304 can remove the indication. For example, the act of the end-user device 304 removing the indication can involve the end-user device 304 causing the light source to stop flashing a light, causing the display device to stop displaying a message, and/or causing the sound speaker to stop playing a tone. Other examples are possible as well.

In variations of these aspects, the act of the end-user device 304 outputting the indication for the predefined time period can involve outputting the indication intermittently or continuously throughout the duration of the predefined time period. For example, the end-user device 304 can flash a light every half second during the time period until the time period has elapsed. Other examples are possible as well.

In other instances, the content system 306 can perform various acts and/or functions to help determine that the end-user device 304 is unsteady and can responsively notify the user of the end-user device 304. These acts and/or functions and related features will now be described.

First, the content system 306 can receive the video stream generated by the end-user device 304. While the content system 306 is receiving the video stream, the content system 306 can make a determination that each condition in a condition set is satisfied, where the condition set includes a condition relating to a change in a data rate of the video stream.

The content system 306 can perform various acts to make the determination, such as the acts described above with regard to the end-user device 304. The content system 306 can select various thresholds for use in making the determination, such as those discussed above, and can determine which thresholds to use in a similar manner as the end-user device 304. For example, the content system 306 can determine which encoding parameters the end-user device 304 is using, and use that determination as a basis for selecting certain thresholds. The content system 306 can determine the encoding parameters in various ways. For instance, the end-user device 304 can notify the content system 306 of which encoding parameters the end-user device 304 is using, the content system 306 can analyze the video stream to determine the encoding parameters, or the content system 306 can learn of the encoding parameters the end-user device 304 from another entity other than the end-user device 304.

Further, in response to the content system 306 making the determination that each condition in the condition set is satisfied, the content system 306 can cause the end-user device 304 to output an indication that the end-user device 304 is unsteady. The indication can take one or more of the forms described above.

In some aspects, the act of the content system 306 causing the end-user device 304 to output the indication can involve transmitting, to the end-user device 304, an instruction to output the indication. In turn, while the end-user device 304 is generating the video stream, the end-user device 304 can receive the instruction and can responsively then output the indication. In other aspects, the act of the content system 306 causing the end-user device 304 to output the indication can involve transmitting, to the end-user device 304, a message including a visual indication that the end-user device 304 is unsteady, such as a text message via a Short Message Service (SMS). In turn, while the end-user device 304 is generating the video stream, the end-user device 304 can receive the message, and can responsively then display the message (or can display an alert to the user that the message has been received).

Additionally or alternatively to the content system 306 causing the end-user device 304 to output the indication, the content system 306 can itself output, via a user interface of the content system 306, an indication that the end-user device 304 is unstable, such as one or more of the indications described above. This can allow a user of the content system 306 to notify a user of the end-user device 304 to stabilize the end-user device 304.

Figure 6:
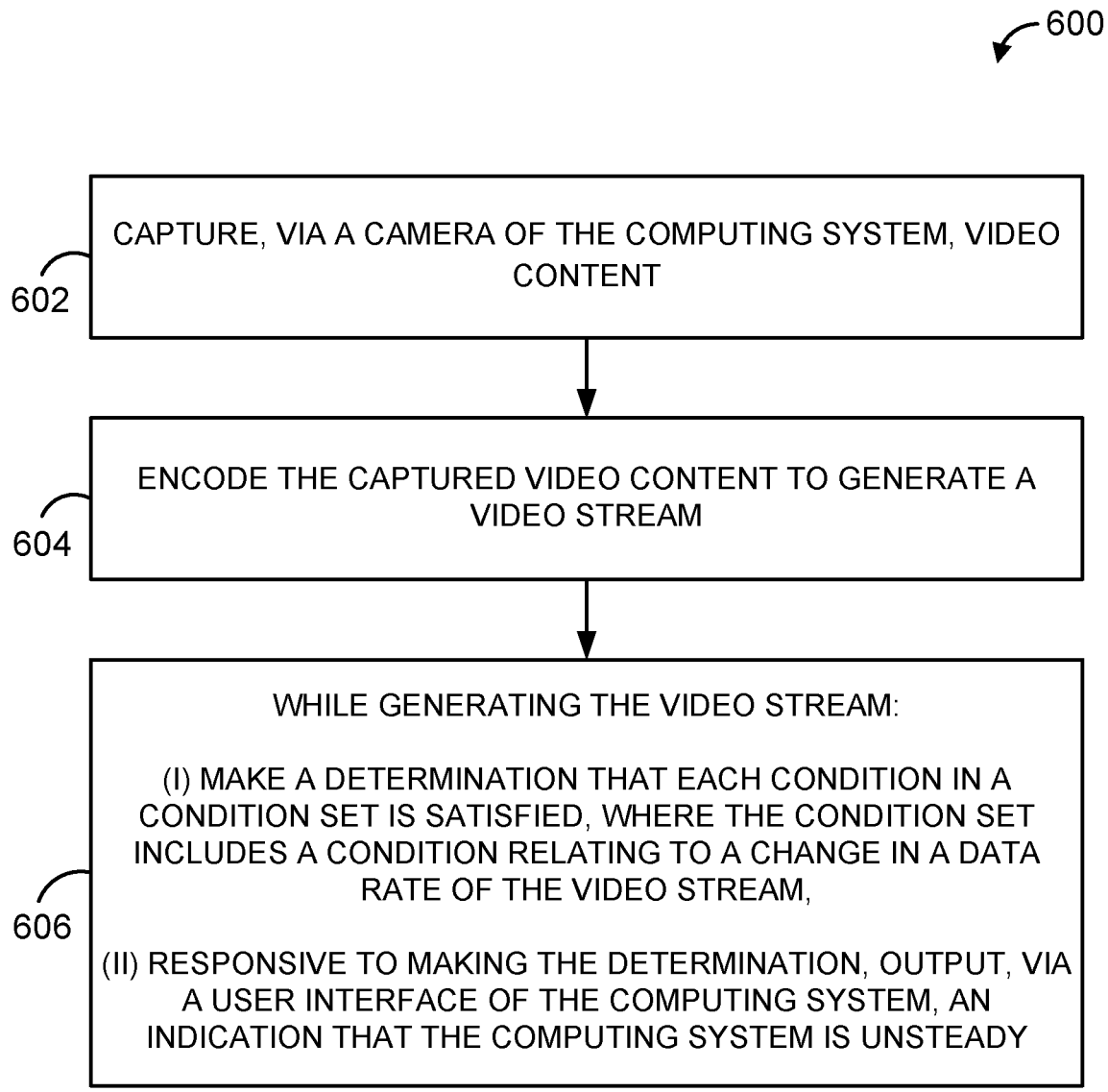
FIG. 6 is a flow chart of an example method.

FIG. 6 is a flow chart illustrating an example method 600. In an example implementation, a computing system such as the end-user device 304 can perform the method 600.

At block 602, the method 600 can include capturing, via a camera of the computing system, video content.

At block 604, the method 600 can include encoding the captured video content to generate a video stream.

At block 606, the method 600 can include, while generating the video stream: (i) making a determination that each condition in a condition set is satisfied, where the condition set includes a condition relating to a change in a data rate of the video stream, and (ii) responsive to making the determination, outputting, via a user interface of the computing system, an indication that the computing system is unsteady.

Figure 7:
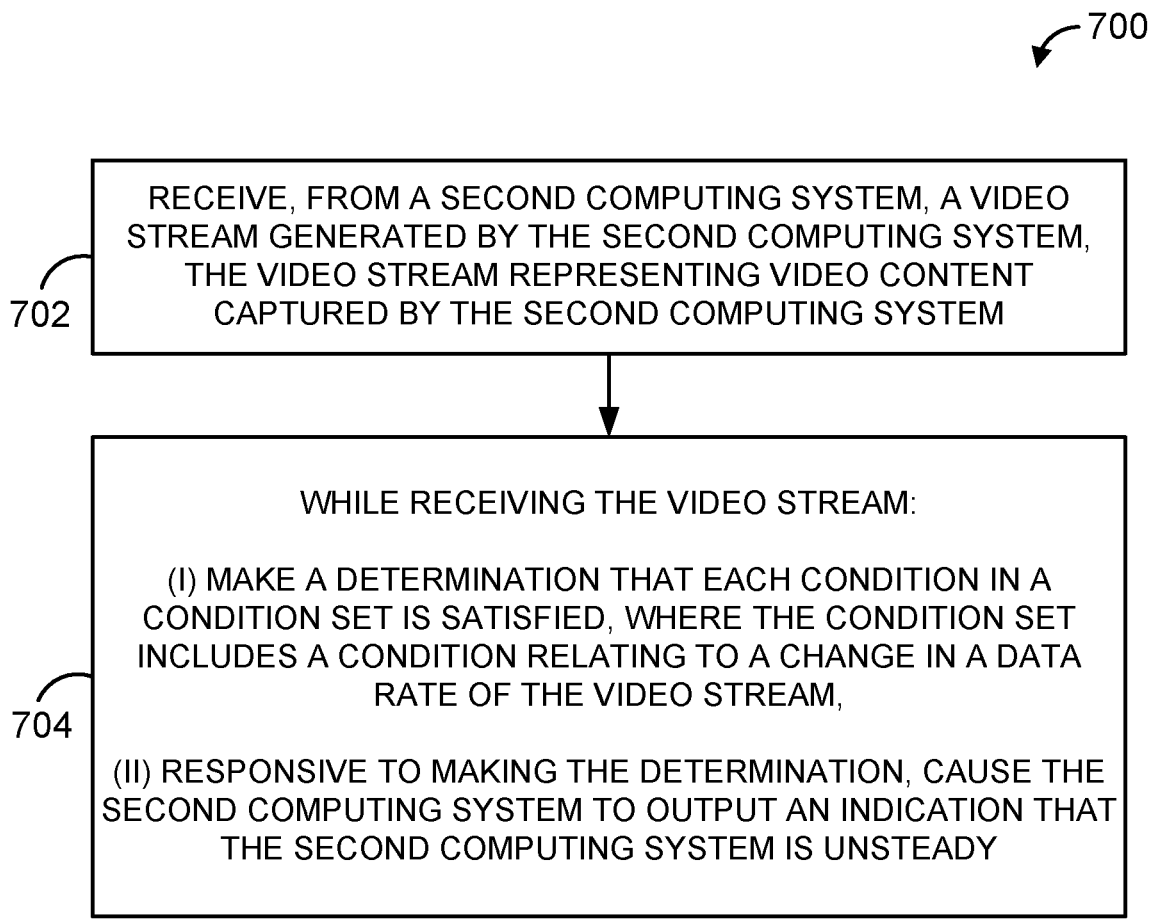
FIG. 7 is a flow chart of an example method.

FIG. 7 is a flow chart illustrating another example method 700. In an example implementation, a first computing system such as the content system 306 can perform the method 700.

At block 702, the method 700 can include receiving, from a second computing system, a video stream generated by the second computing system, the video stream representing video content captured by the second computing system.

At block 704, the method 700 can include, while receiving the video stream: (i) making a determination that each condition in a condition set is satisfied, where the condition set includes a condition relating to a change in a data rate of the video stream, and (ii) responsive to making the determination, causing the second computing system to output an indication that the second computing system is unsteady.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
receiving, by a computing system, from an end-user device, a video stream generated by the end-user device, the video stream representing video content captured by a camera of the end-user device, wherein the video stream has a data rate, wherein the data rate is an amount of data of the video stream that is streamed per unit of time; and
while receiving the video stream:
making, by the computing system, a determination that each condition in a condition set is satisfied, wherein the condition set includes a condition relating to a change in the data rate of the video stream with respect to at least one threshold, and wherein the at least one threshold is selected by the computing system based on one or more encoding parameters being used by the end-user device to generate the video stream; and
responsive to making the determination, causing, by the computing system, the end-user device to output, via a user interface of the end-user device, an indication that the end-user device is unsteady.

2. The method of claim 1, wherein the one or more encoding parameters includes an encoding standard being used by the end-user device to generate the video stream.

3. The method of claim 1, wherein the computing system is a content system of a video production system (VPS), wherein the VPS is configured to integrate the video stream into a video program for production.

4. The method of claim 1, wherein causing the end-user device to output the indication comprises transmitting, to the end-user device, an instruction to output the indication, the method further comprising:
while the end-user device is generating the video stream:
receiving, by the end-user device, from the computing system, the instruction; and
responsive to receiving the instruction, outputting, by the end-user device, via the user interface of the end-user device, the indication.

5. The method of claim 1, wherein the indication is a visual indication, and wherein causing the end-user device to output the indication comprises transmitting, to the end-user device, a message including the visual indication, the method further comprising:
while the end-user device is generating the video stream:
receiving, by the end-user device, from the computing system, the message including the visual indication; and
responsive to receiving the message including the visual indication, displaying, by the end-user device, via the user interface of the end-user device, the message.

6. The method of claim 1, wherein the at least one threshold includes a threshold amount, and
wherein the condition is that the change in the data rate of the video stream is at least the threshold amount.

7. The method of claim 1, wherein the generated video stream includes a first portion and a second portion that is different from the first portion, the method further comprising:
while generating the video stream, determining, by the computing system, a first data rate of the first portion and a second data rate of the second portion,
wherein the at least one threshold includes a first threshold data rate and a second threshold data rate, and
wherein the condition is that the determined first data rate is less than the first threshold data rate and the determined second data rate is greater than the second threshold data rate.

8. The method of claim 7, wherein each of the first and second portions of the generated video stream include a common portion of the generated video stream.

9. A non-transitory computer-readable medium having stored thereon program instructions that upon execution by a processor, cause performance of a set of acts comprising:
receiving, by a computing system, from an end-user device, a video stream generated by the end-user device, the video stream representing video content captured by a camera of the end-user device, wherein the video stream has a data rate, wherein the data rate is an amount of data of the video stream that is streamed per unit of time; and
while receiving the video stream:
making, by the computing system, a determination that each condition in condition set is satisfied, wherein the condition set includes a condition relating to a change in the data rate of the video stream with respect to at least one threshold, wherein the at least one threshold is selected by the computing system based on one or more encoding parameters being used by the end-user device to generate the video stream; and responsive to making the determination, causing, by the computing system, the end-user device to output, via a user interface of the end-user device, an indication that the end-user device is unsteady.

10. The non-transitory computer-readable medium of claim 9, wherein the one or more encoding parameters includes an encoding standard being used by the end-user device to generate the video stream.

11. The non-transitory computer-readable medium of claim 9, wherein the computing system is a content system of a video production system (VPS), wherein the VPS is configured to integrate the video stream into a video program for production.

12. The non-transitory computer-readable medium of claim 9, wherein causing the end-user device to output the indication comprises transmitting, to the end-user device, an instruction to output the indication, the set of acts further comprising:

while the end-user device is generating the video stream:
receiving, by the end-user device, from the computing system, the instruction; and
responsive to receiving the instruction, outputting, by the end-user device, via the user interface of the end-user device, the indication.

13. The non-transitory computer-readable medium of claim 9, wherein the indication is a visual indication, and wherein causing the end-user device to output the indication comprises transmitting, to the end-user device, a message including the visual indication, the set of acts further comprising:

while the end-user device is generating the video stream:
receiving, by the end-user device, from the computing system, the message including the visual indication; and
responsive to receiving the message including the visual indication, displaying, by the end-user device, via the user interface of the end-user device, the message.

14. The non-transitory computer-readable medium of claim 9, wherein the at least one threshold includes a threshold amount, and
wherein the condition is that the change in the data rate of the video stream is at least the threshold amount.

15. The non-transitory computer-readable medium of claim 9, wherein the generated video stream includes a first portion and a second portion that is different from the first portion, the set of acts further comprising:

while generating the video stream, determining, by the computing system, a first data rate of the first portion and a second data rate of the second portion,
wherein the at least one threshold includes a first threshold data rate and a second threshold data rate, and
wherein the condition is that the determined first data rate is less than the first threshold data rate and the determined second data rate is greater than the second threshold data rate.

16. The non-transitory computer-readable medium of claim 15, wherein each of the first and second portions of the generated video stream include a common portion of the generated video stream.

17. A computing system comprising:
a communication interface,
wherein the computing system is configured for performing a set of acts comprising:
receiving, from an end-user device, a video stream generated by the end-user device, the video stream representing video content captured by a camera of the end-user device, wherein the video stream has a data rate, wherein the data rate is an amount of data of the video stream that is streamed per unit of time; and
while receiving the video stream:
making a determination that each condition in a condition set is satisfied, wherein the condition set includes a condition relating to a change in the data rate of the video stream with respect to at least one threshold, wherein the at least one threshold is selected by the computing system based on one or more encoding parameters being used by the end-user device to generate the video stream; and
responsive to making the determination, causing the end-user device to output, via a user interface of the end-user device, an indication that the end-user device is unsteady.

18. The computing system of claim 17, wherein the computing system is a content system of a video production system (VPS), wherein the VPS is configured to integrate the video stream into a video program for production.

19. The computing system of claim 17, wherein the at least one threshold includes a threshold amount, and
wherein the condition is that the change in the data rate of the video stream is at least the threshold amount.

20. The computing system of claim 17, wherein the one or more encoding parameters includes an encoding standard being used by the end-user device to generate the video stream.

* * * * *